No. 784,153. PATENTED MAR. 7, 1905.
T. G. GORDON.
HAME HOOK.
APPLICATION FILED MAY 17, 1904.
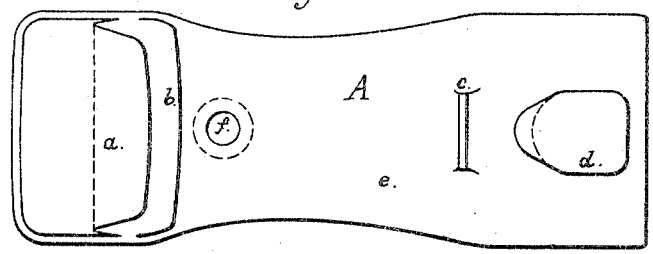
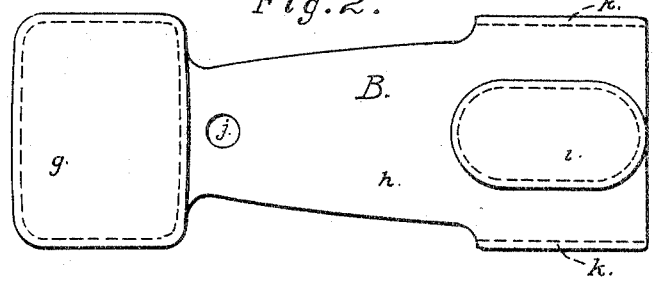
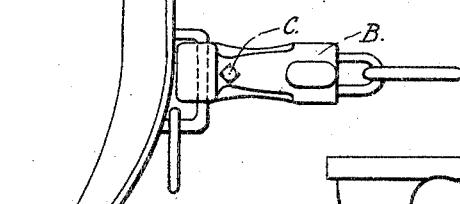
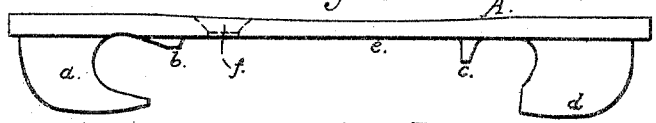
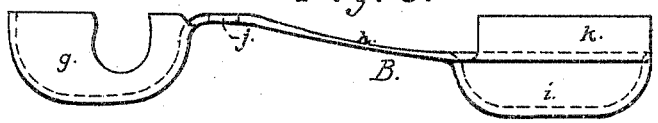
Witnesses.
Winifred G. Babcock.
Guy J. Hely.
Inventor.
Thomas Gortney Gordon No. 784,153. Patented March 7, 1905.

UNITED STATES PATENT OFFICE.

THOMAS GORTNEY GORDON, OF MADERA, CALIFORNIA.

HAME-HOOK.

SPECIFICATION forming part of Letters Patent No. 784,153, dated March 7, 1905.

Application filed May 17, 1904. Serial No. 208,401.

*To all whom it may concern:*

Be it known that I, THOMAS GORTNEY GORDON, a citizen of the United States, residing at Madera, in the county of Madera, State of California, have invented a new and useful Improvement in Hame-Hooks, of which the following is a specification.

My invention relates to improvements in hame-hooks for attaching the tugs and chains of work-harness or the tugs of carriage-harness to the hames.

My improved hame-hooks can be used interchangeably upon either the right side or the left side, but one form being required.

The objects of my invention are, first, to make a hame-hook of such form and construction that the tugs or chains will not become unfastened from the hames by accident or otherwise, unless it is desired to unhook the same, in which case it can easily be done by proper manipulation; second, to make a hame-hook of such form and construction that the other parts of the same harness or the harness upon other animals will not be caught in the hook; third, to make a harness-hook of such form and construction that it will not cut or wear the collar where it is attached to the hames; fourth, to make a harness-hook of such form and construction that it can easily be attached to or detached from the harness. I attain these objects by the construction illustrated in the accompanying drawings, in which—

Figure 1 is a front view of the hook without the cap or cover. Fig. 2 is a view of the cap or cover. Fig. 3 is a side elevation of the bolt and nut used to secure the cover in place. Fig. 4 is a side elevation of the hook. Fig. 5 is a side elevation of the cap. Fig. 6 is a view of a hame with the hook and cap in operative position.

Referring to the drawings, $a\ b$ represent the hook which clasps the staple in the hame D, and $c\ d$ represent the hook which receives and holds the link of a trace-chain or the eye-bolt of a tug.

$f$ represents a bolt-hole, and $e$ the shaft or body of the hook.

The whole hook A is made of metal, preferably of malleable cast-iron.

$j$ represents a bolt-hole.

The whole cap or cover B is made of metal, preferably of sheet spring-steel.

C represents a small bolt and nut by which after the hook has been placed in the staple of the hame the cap or cover is bolted on.

The cover or guard B comprises the body $h$, provided with the openings $j$, which correspond to the opening $f$ for the reception of the clamping-bolt C, and the hame-hook guard $g$ and trace-hook guard $i$, which terminates upon its upper edges with the protecting-flanges $k$, which rest upon the bottom and top edges of the body A opposite the trace or chain connection or hook $c\ d$.

In Fig. 6, I show the hook in use and in place, attached to the hame D and to trace-chain, the hook closed and covered by the spring-metal cap B, which is held in place by the bolt and nut C.

What I claim as my invention, and desire to secure by Letters Patent, is—

A hame-hook comprising a metallic body having an opening therethrough, a hook upon each end to engage a trace or a hame respectively; a cover for the body comprising a body having an opening therethrough, and a guard $g$ to cover the hame-hook and a guard $i$ to cover the trace-hook; and means to enter said openings to clamp the cover to the body.

In testimony whereof I have signed my name to this specification in the presence of two subscribing witnesses.

THOMAS GORTNEY GORDON.

Witnesses:
 WINIFRED G. BABCOCK,
 GUY J. HELY.